(12) United States Patent
Martínez-Galdámez Ruiz (10) Patent No.: US 12,551,223 B2
(45) Date of Patent: Feb. 17, 2026

(54) CLOT REMOVAL DEVICE

(71) Applicant: Mario Martínez-Galdámez Ruiz, Madrid (ES)

(72) Inventor: Mario Martínez-Galdámez Ruiz, Madrid (ES)

(*) Notice: Subject to any disclaimer, the term of this patent is extended or adjusted under 35 U.S.C. 154(b) by 171 days.

(21) Appl. No.: 18/240,647

(22) Filed: Aug. 31, 2023

(65) Prior Publication Data
US 2025/0072919 A1 Mar. 6, 2025

(51) Int. Cl.
*A61B 17/22* (2006.01)

(52) U.S. Cl.
CPC ........... *A61B 17/22031* (2013.01); *A61B 2017/22034* (2013.01); *A61B 2017/22038* (2013.01)

(58) Field of Classification Search
CPC ............ A61B 17/22031; A61B 17/221; A61B 2017/22034; A61B 2017/22038; A61B 2017/2212; A61B 2017/2215
USPC ......................................................... 606/159
See application file for complete search history.

(56) References Cited

U.S. PATENT DOCUMENTS

| | | | |
|---|---|---|---|
| 6,887,258 B2* | 5/2005 | Denison | A61F 2/012 606/127 |
| 7,537,600 B2* | 5/2009 | Eskuri | A61F 2/2476 606/200 |
| 2006/0161244 A1 | 7/2006 | Seguin | |
| 2007/0208361 A1* | 9/2007 | Okushi | A61B 17/320758 606/159 |
| 2013/0138200 A1 | 5/2013 | Mayberry et al. | |
| 2016/0106449 A1* | 4/2016 | Brady | A61B 17/12109 606/159 |
| 2016/0120558 A1* | 5/2016 | Brady | A61B 17/221 606/159 |
| 2019/0380726 A1* | 12/2019 | Grandfield | A61B 17/221 |
| 2021/0121280 A1 | 4/2021 | Haldis et al. | |

OTHER PUBLICATIONS

Search Report and Written Opinion on Patentability issued on Feb. 15, 2024, in corresponding European Application No. 23 19 4580, 5 pages.

* cited by examiner

*Primary Examiner* — Jocelin C Tanner
(74) *Attorney, Agent, or Firm* — Maier & Maier, PLLC (57) ABSTRACT

A clot removal device for removing at least one clot from an inside of a blood vessel having a bifurcation. The clot removal device includes a clot removal member, configured to be positioned at the bifurcation, the clot removal member including a base configured to be positioned inside the proximal blood vessel, and two anchoring members, wherein at least one of the anchoring members is configured to be positioned inside at least one of the two distal blood vessels, each anchoring member including at least one self-expanding portion configured to adopt a collapsed configuration configured for navigating the clot removal device inside the blood vessel, and an expanded configuration configured for anchoring to the clot.

8 Claims, 7 Drawing Sheets

CLOT REMOVAL DEVICE

FIELD

The present invention relates to a clot removal device for removing at least one clot from an inside of a blood vessel. The invention further relates to a system for clot removal comprising a clot removal device. The invention also relates to a method for removing at least one clot from an inside of a blood vessel using a clot removal device and to a method for removing at least one clot from an inside of a blood vessel using a clot removal system.

BACKGROUND

A blood clot, also known as a thrombus, is a gel-like mass of blood cells that seals off a damaged blood vessel and prevents further blood loss.

While blood clots are essential for preventing excessive bleeding, they can also pose risks if they form inappropriately or occur in critical blood vessels. Indeed, blood clots can be problematic if they obstruct blood flow or dislodge and travel to other parts of the body, leading to potentially life-threatening conditions. When a blood clot travels and lodges in a blood vessel, it is called an embolus, and the condition is known as an embolism.

Blood clots are naturally dissolved by the body through a process called fibrinolysis. To help this process, a patient may be given medications such as anticoagulant to prevent further clotting and promote the body's natural removal process. In some cases, especially when there is a severe or life-threatening clot, the use of a mechanical intervention may be necessary to remove or break down the clot.

Clot removal devices, also called "stentrievers" or "stent-retrievers", are mechanical devices specialized in endovascular procedures for clot retrieval, particularly in the treatment of acute ischemic strokes. Clot removal devices are configured to capture and remove the clot from a blocked blood vessel in the brain to restore blood flow.

To that end, a clot removal device has a tubular shape with a mesh-like structure comprising interconnected wires arranged in a pattern allowing for radial expansion near a blood clot.

There are several challenges associated with designing performant clot removal devices. Indeed, the vasculature of neurovascular vessels is even more fragile than other similar-sized vessels from other parts of the body. Excessive forces applied on these vessels can result in perforations and hemorrhages.

Furthermore, clot removal devices rely on outward radial forces to grip the clot. If the outward radial force is too low, the device loses grip with the clot an cannot remove it from the blood vessel. On the contrary, when the outward radial force is too low, the device may damage the vessel.

Therefore, it is an objective on the invention to come up with a clot removal device that is more performant in removing blood clots, while avoiding damaging the surrounding blood vessels.

SUMMARY

To solve the aforementioned challenges, the invention relates to a clot removal device for removing at least one clot from an inside of a blood vessel, said blood vessel comprising a bifurcation wherein a proximal blood vessel is divided into at least two distal blood vessels, said distal blood vessels, said clot removal device comprising:

a guiding wire configured for navigating the clot removal device inside said blood vessel,
a clot removal member, configured to be positioned at the bifurcation, the clot removal member comprising:
   a base configured to be positioned inside the proximal blood vessel, the base being connected to the guiding wire, and
   two anchoring members including a first anchoring member and a second anchoring member, wherein at least one of the first anchoring member and second anchoring member is configured to be positioned inside at least one of the two distal blood vessels, the anchoring members being connected to the base, each anchoring member comprising at least one self-expanding portion configured to adopt:
      a collapsed configuration configured for navigating the clot removal device inside said blood vessel, and
      an expanded configuration configured for anchoring to the clot.

In other words, the invention is a clot removal device comprising two anchoring members capable of anchoring to the clot. Having two anchoring members allows to improve the grip on the clot and to improve the chances of removing the clot in a single intervention. The clot removal device is particularly useful to remove high fibrin rich clots, large clots and clots located in arterial bifurcations, which usually require the use of two conventional clot removal devices simultaneously introduced at the blood clot site. Indeed, using two clot removal devices requires longer surgical procedures and it is technically more difficult to navigate the two clot removal devices at the same time. The device of the invention allows the deployment of two anchoring members in a single step, with one single device, which means a faster and easier maneuver, accessible to all operators.

According to an embodiment, each anchoring member is configured to wrap around a first longitudinal axis, the self-expanding portion having:
   a collapsed diameter when in the collapsed configuration, and
   an expanded diameter when in the expanded configuration,
the expanded diameter being greater than the collapsed diameter.

In other words, the two anchoring members have a tubular shape configured to anchor to the blood clot. Each anchoring member is configured to self-expand to adapt to the size of the surrounding blood vessel.

In practice, the clot removal member is a layered structure comprising a distal region and a proximal region positioned along a third longitudinal axis of the clot removal member, the distal region comprising a longitudinal slit so as to form the first anchoring member and the second anchoring member on both sides of the slit, the base being formed in the proximal region.

Advantageously, the clot removal member is a mesh structure, wherein the dimensions of the motif of the mesh is adapted to better anchor to the blood clot.

In a preferred embodiment, the first anchoring member has a length greater than a length of the second anchoring member. The purpose of having different lengths for the anchoring members is to increase the clot removal effect into the proximal vessel, where the clot is bigger, and also, at the same time, remove the clot component located into the distal vessel thanks to the longer anchoring member.

According to another aspect, the invention also relates to a clot removal system comprising a delivery tube, said delivery tube comprising a clot removal device such as described above. The delivery tube is configured to allow the clot removal device to slidably move within the delivery tube. The self-expanding sections are in the collapsed configuration when contained in the delivery tube and the self-expanding sections are configured to adopt the expanded configuration when outside of the delivery tube.

According to another aspect, the invention relates to a method for removing at least one clot from an inside of a blood vessel using a clot removal device such as described previously. The blood vessel comprises a bifurcation wherein a proximal blood vessel is divided into at least two distal blood vessels. The method comprises the steps of:

introducing the clot removal device inside said blood vessel so that the clot removal member is positioned at the bifurcation with the base positioned inside the proximal blood vessel and at least one of the first anchoring member and second anchoring member is positioned inside at least one of the two distal blood vessels, and making the self-expanding portions adopt the expanded configuration so that the anchoring members can anchor to the clot.

According to an embodiment, the method further comprises the step of navigating the clot removal device outside of the blood vessel using the guiding wire.

The invention also relates to a method for removing at least one clot from an inside of a blood vessel using a clot removal system such as described previously. The blood vessel comprises a bifurcation wherein a proximal blood vessel is divided into at least two distal blood vessels. The method comprises the steps of:

introducing the clot removal system inside said blood vessel, slidably extracting the clot removing device from within said delivery tube, so that the self-expanding sections adopt the expanded configuration and the clot removal member is positioned at the bifurcation with the base positioned inside the proximal blood vessel and at least one of the first anchoring member and second anchoring member is positioned inside at least one of the two distal blood vessels.

DETAILED DESCRIPTION

Figure 1:
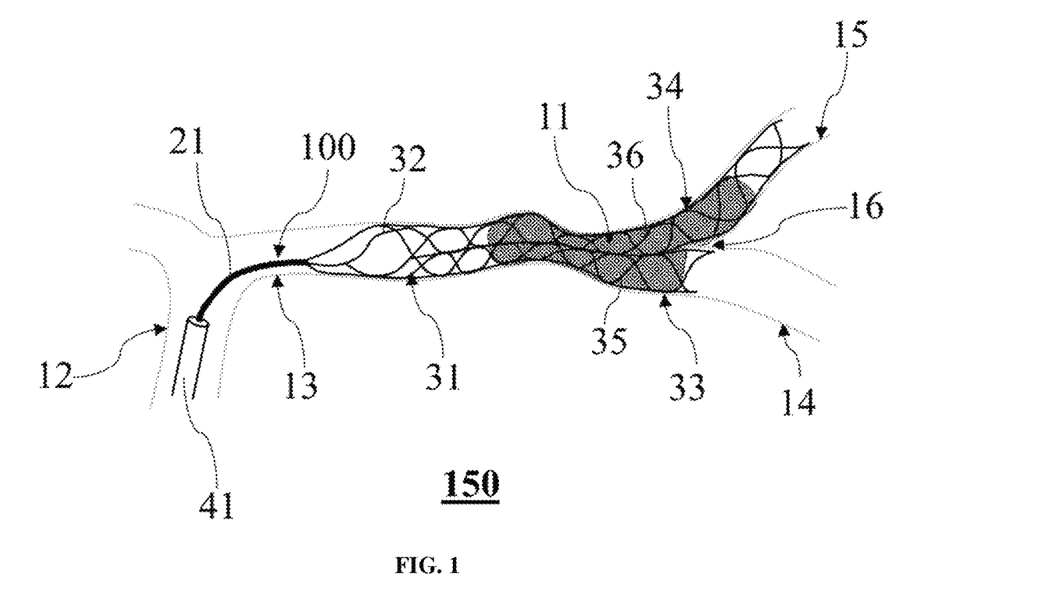
FIG. 1 is a schematic longitudinal section view of a clot removal device positioned inside a blood vessel according to an embodiment of the invention.

As illustrated on FIG. 1, the invention relates to a clot removal system 150 that may be introduced inside a blood vessel 12, whose blood flow is blocked by a clot 11 made of aggregated platelets reinforced by a fibrin mesh. The blood clot 11 is usually localized in a blood vessel 12 of the brain and the clot removal system 150 is designed to capture and retrieve the blood clot 11.

The clot removal system 150 includes a delivery tube 41 configured to contain a clot removal device 100. The clot removal device 100 comprises a clot removal member 31 configured to physically engage with the clot 11, and a guiding wire 21, connected to the clot removal member 31, configured for navigating the clot removal member 31

The guiding wire 21 is usually made of a strong and flexible material, such as stainless steel or nitinol, to withstand the forces applied during the procedure. The diameter of the guiding wire 21 typically ranges from approximately 0.3 mm to 0.5 mm. The length of the guiding wire 21 can range from around 160 cm to 180 cm or longer. This length ensures sufficient reach and maneuverability during the endovascular procedure. The guiding wire 21 may be connected to the clot removal member 31 by a weld.

The clot removal member 31 comprises a base 32 and at least two anchoring members 33, 34. The number of anchoring members 33, 34 may be equal to two or three or more depending on the application.

Figure 8:
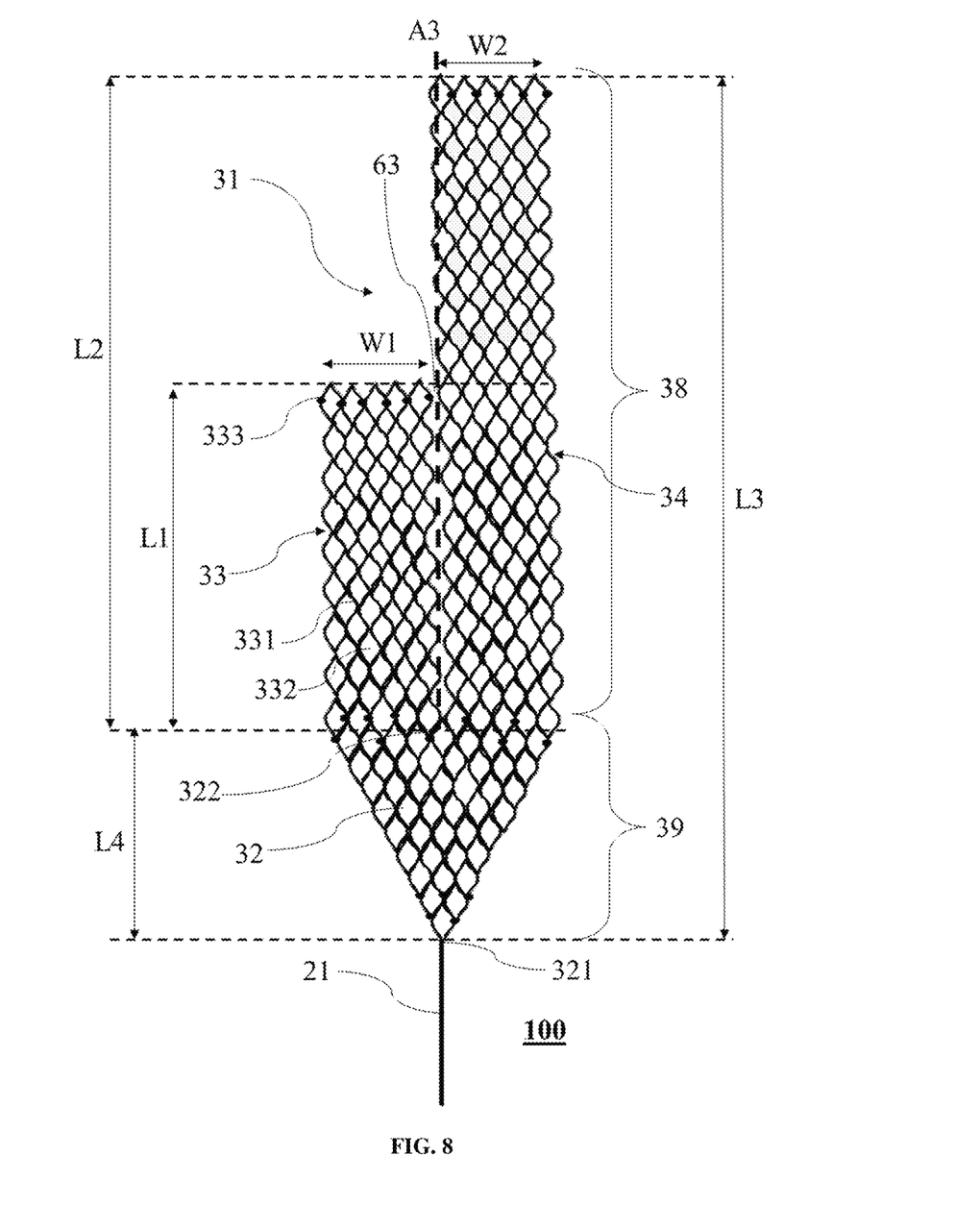
FIG. 8 is front view of the device from FIG. 1 in an unfolded configuration.

FIG. 8 is a representation of a clot removal member 31 with two anchoring members 33, 34, in a flattened configuration. The clot removal member 31 comprises a distal region 38 and a proximal region 39 positioned alongside a third longitudinal axis A3 of the clot removal member 31.

The base 32 is formed in the proximal region 39. The base 32 preferably has a triangular shape with an apex 321 configured to be connected to the guiding wire 21. The side 322 of the triangle, opposite to the apex 321 is connected to the anchoring members 33, 34.

The distal region 38 of the clot removal member 31 has a parallelepipedal shape. A longitudinal slit 63 is formed along the third longitudinal axis A3 of the distal region 38, so as to form the first anchoring member 33 and the second anchoring member 34 on both sides of the slit 63. Alternatively, several slits may be formed along the third longitudinal axis A3 to create more than two anchoring members.

Alternatively, the clot removal member 31 may be formed using two distinct layered structures that may be joined in the proximal region 39 to form the base 32. The layered structures may be joined by intertwining or soldering the layered structures together.

The total length L3 of the clot removal member 31 typically ranges from about 20 mm to 70 mm, and preferably 50 mm. The base 32 preferably has a length L4 comprised between 5 mm and 10 mm. The first anchoring member 33 and the second anchoring member 34 have lengths L1, L2 comprised between 20 mm and 45 mm. The first anchoring member 33 and the second anchoring member 34 may have the same length L1, L2. Alternatively, the first anchoring member 33 and the second anchoring member 34 have different lengths L1, L2. For instance, the length L1 of the first anchoring member 33 may be greater than the length L2 of the second anchoring member 34. As an example, the length L2 of the second anchoring member 34 may be comprised between 35 mm and 45 mm and the length L1 of the first anchoring member 33 may be comprised between 25 mm and 35 mm. Advantageously, the length L2 is greater of 15 mm to 25 mm, preferably 20 mm, than the length L1.

The side 322 of the triangle opposite to the apex 321 may have a width comprised between 8 mm and 15 mm. The width W1 of the first anchoring member 33 may be comprised between 5 mm and 10 mm and the width W2 of the second anchoring member 34 may be comprised between 5 mm and 10 mm. Preferably, the first anchoring member 33 and the second anchoring member 34 have the same width W1, W2.

The clot removal member 31 is preferably a mesh structure made of interconnected wires 331. The motif of the mesh may for instance be a square, diamond, or circular motif 332 or a combination thereof. The motif 332 is designed to optimize clot 11 engagement, capture, and retrieval efficiency. The spacing and orientation of the wires 331 within the motif 332 is crucial for ensuring proper clot 11 entanglement and minimizing the risk of clot 11 migration during retrieval. For example, the spacing between the motifs 332 may range from a fraction of a millimeter to a few millimeters. The individual wires 331 in the mesh structure can vary based on the clot removal member 31 design. The thickness of the wires 331 can range from a fraction of a millimeter to a few millimeters. The density of the mesh structure refers to the spacing between the individual wires 331. The mesh density can range from 0.1 mm to 0.5 mm.

The clot removal member 31 is made of a biocompatible metal alloy. The most commonly used material is nitinol, a nickel-titanium alloy. Nitinol is known for its excellent shape-memory characteristics, allowing the clot removal member 31 to be compressed for delivery and then expand to its pre-shaped form upon deployment. Nitinol also provides flexibility, strength, and good radial force to engage and capture the clot 11 effectively. The biocompatibility of nitinol ensures that the clot removal member 31 is well-tolerated by the body, thus minimizing the risk of adverse reactions or complications.

Advantageously, radiopaque markers 333, which are small metallic components, may be incorporated into the clot removal member 31 and more precisely, in the proximal region 39 and at the distal end of the distal region 38 and in the central part of the clot removal member 31, where the base 32 connects to the first anchoring member 33 and the second anchoring member 34. These radiopaque markers 333 are visible under X-ray fluoroscopy and allow to track and guide the positioning of the clot removal device 100 within the blood vessel 12. The radiopaque markers 333 help ensure accurate placement and retrieval of the clot removal device 100. The radiopaque markers 333 are usually made of materials such as platinum, tantalum or tungsten or other radiodense materials.

The clot removal member 31 may advantageously be obtained from a larger mesh and cut to the correct shape and dimensions using laser cutting.

Figure 2:
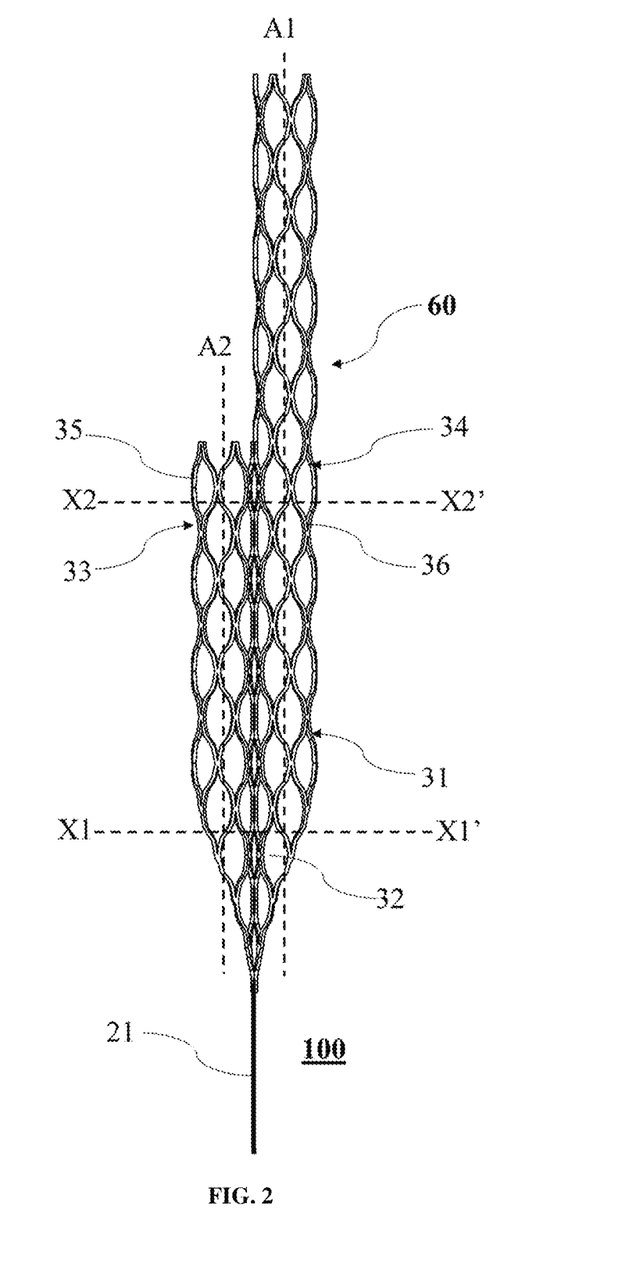
FIG. 2 is a front view of the device from FIG. 1 in the expanded configuration.
Figure 5:
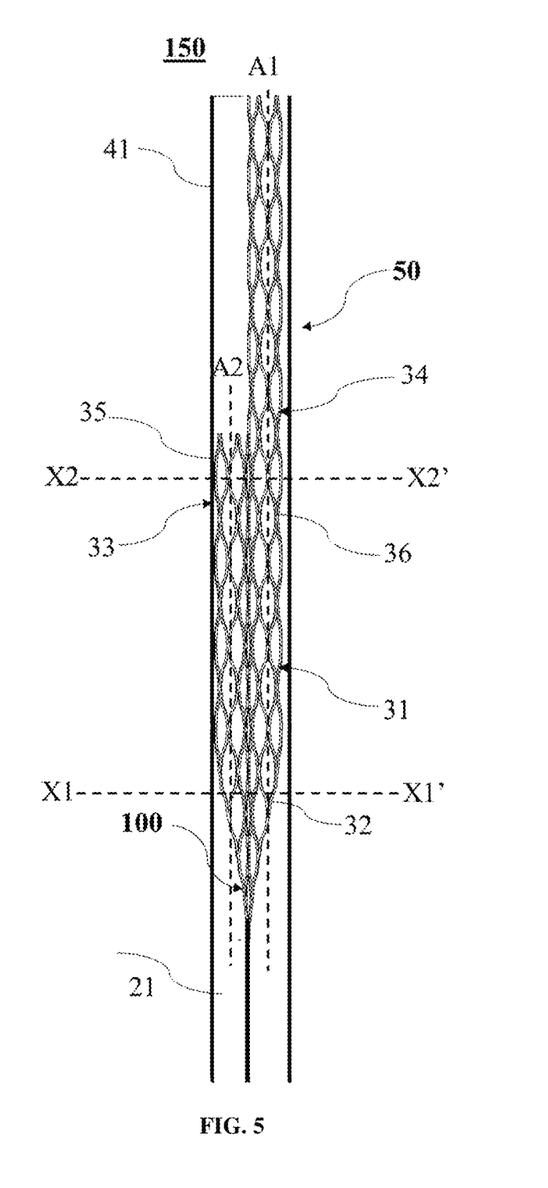
FIG. 5 is a front view of the device from FIG. 1 positioned inside a delivery tube and in the expanded configuration.

The clot removal member 31 is configured to adopt two configurations: a collapsed configuration 50, illustrated in FIG. 5, for navigating the clot removal device 100 inside the body, and an expanded configuration 60, illustrated in FIG. 2, for anchoring to the clot 11.

In these two configurations, the clot removal member 31 is folded around two longitudinal axes, including a first longitudinal axis A1 and a second longitudinal axis A2.

Figure 4:
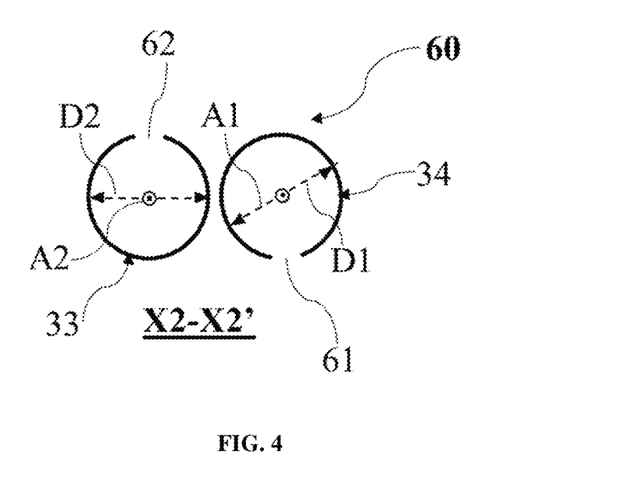
FIG. 4 is a cross-sectional view of the device from FIG. 2 along a transversal axis of the distal region.

As illustrated in FIG. 4, in the expanded configuration 60, the first anchoring member 33 is folded around the first longitudinal axis A1 and the second anchoring member 34 is folded around the second longitudinal axis A2. Both anchoring members 33, 34 thus adopt a tubular shape with an opened distal end. Therefore, the cross-section of the anchoring members 33, 34 alongside the X2-X2' axis is an opened circle comprising a slit 61, 62. The diameter D1, D2 of the anchoring members 33, 34 in the expanded configuration 60 can range from approximately 2 mm to 6 mm. This expanded configuration 60 allows the anchoring members 33, 34 to create a scaffold that encompasses the clot 11, thus enabling effective entanglement and capture.

Figure 3:
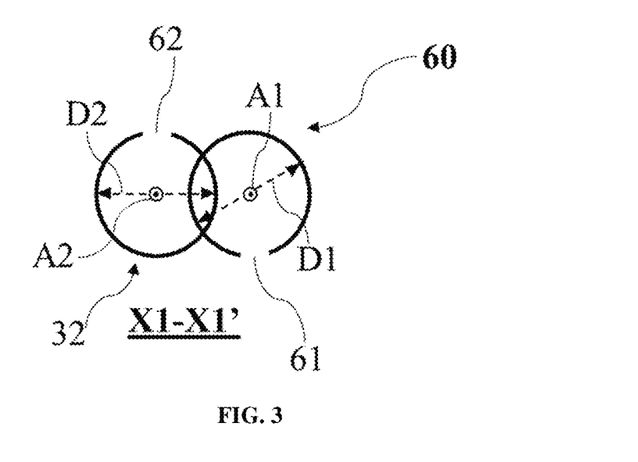
FIG. 3 is a cross-sectional view of the device from FIG. 2 along a transversal axis of the proximal region.

The base 32 may be formed by entwining the tubes formed by the anchoring members 33, 34 such as illustrated on FIG. 3. Therefore, the cross-section of the base 32 alongside the X1-X1' axis comprises two entwined opened circles comprising each a slit 61, 62. Alternatively, when the base 32 is formed using two distinct layered structures joined in the proximal region 39, the base 32 folds around a single base axis, while the first anchoring member 33 is folded around the first longitudinal axis A1 and the second anchoring member 34 is folded around the second longitudinal axis A2.

Figure 7:
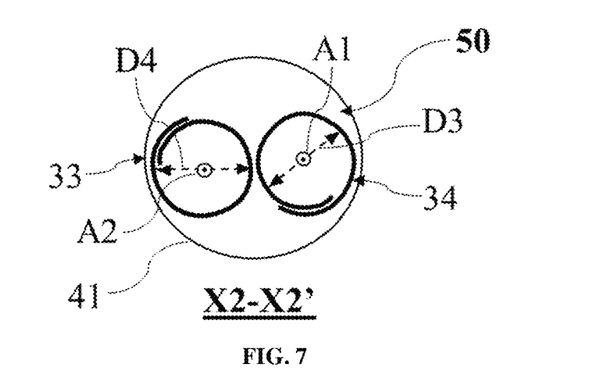
FIG. 7 is a cross-sectional view of the device from FIG. 5 along an axis of the distal region.

As illustrated in FIG. 7, in the collapsed configuration 50, the first anchoring member 33 is folded around the first longitudinal axis A1 and the second anchoring member 34 is folded around the second longitudinal axis A2. Both anchoring members 33, 34 also adopt a tubular shape with an opened distal end. Therefore, the cross-section of the anchoring members 33, 34 alongside the X2-X2' axis is a circle comprising a slit 61, 62, wherein the extremities of the circle bordering the slit 61, 62 are overlapping. The diameter D3, D4 of the anchoring members 33, 34 in the collapsed configuration 50 is therefore smaller than in the expanded configuration and can range from approximately 1 mm to 4 mm. This collapsed configuration allows the anchoring members 33, 34 to be contained into the delivery tube 41.

Figure 6:
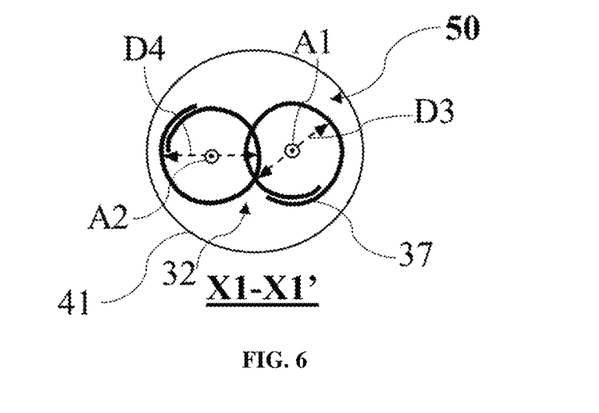
FIG. 6 is a cross-sectional view of the device from FIG. 5 along an axis of the proximal region.

The base 32 is also formed by entwining the tubes formed by the anchoring members 33, 34 such as illustrated on FIG. 6. Therefore, the cross-section of the base 32 alongside the X1-X1' axis comprises two entwined opened circles comprising each a slit 61, 62 and wherein the extremities of the circle bordering the slit 61, 62 are overlapping.

Figure 9:
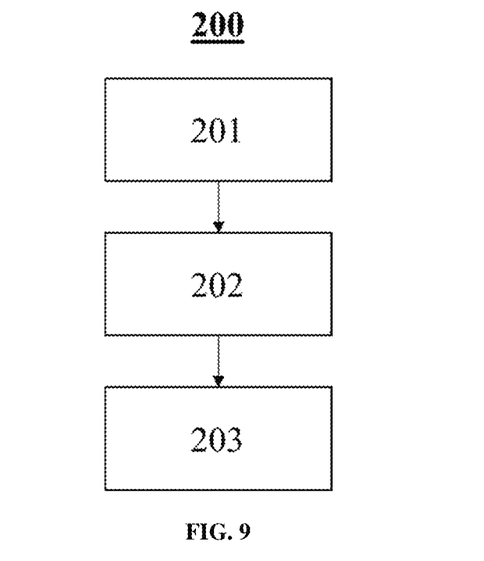
FIG. 9 is a graphical representation of the steps of the method for removing at least one clot from an inside of a blood vessel using a clot removal device from FIG. 1.

As illustrated in FIG. 9, the invention also relates to a method 200 for removing at least one clot 11 from an inside of a blood vessel 12 using a clot removal device 100 such as described above. The clot removal device 100 may be introduced 201 inside a blood vessel 12 such as illustrated in FIG. 1, so that the clot removal member 31 is positioned at the bifurcation 16 of the blood vessel 12. Preferably, the base 32 and the first anchoring member 33 are positioned inside the proximal blood vessel 13, while the second anchoring member 34 extends inside one distal blood vessel 14, 15. The self-expanding portions 35, 36 of the first anchoring member 33 and second anchoring member 34 are then configured to adopt the expanded configuration 60 to anchor to the clot 11. After being anchored to the clot 11, the clot removal device 100 is navigated 203 outside of the blood vessel 12 using the guiding wire 21.

Figure 10:
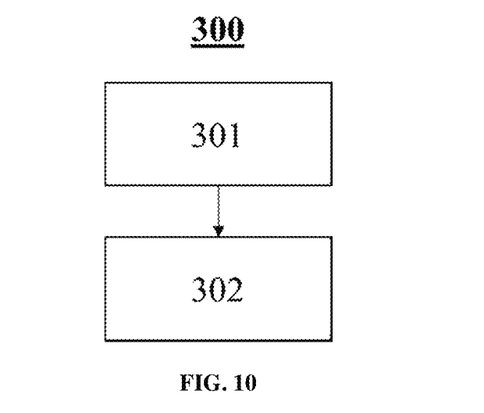
FIG. 10 is a graphical representation of the steps of the method for removing at least one clot from an inside of a blood vessel using a clot removal system according to the invention.

The invention also relates to a method 300 for removing at least one clot 11 from an inside of the body using a clot removal system 150 including a clot removal device 100. The removal of the clot 11 is performed through an endovascular surgery procedure, which is a minimally invasive surgery involving the selection of an arterial access point, established depending on the localization of the clot 11. The arterial access point may for instance be localized in the femoral artery.

Usually, a guiding catheter is first threaded through the arterial system, for instance under X-ray guidance, to reach the targeted blood vessel 12 where the clot 11 is located. The guiding catheter serves as a pathway for the subsequent insertion of the clot removal system 150. The specific dimensions and material used for the guiding catheter depend on the clinical scenario, patient anatomy, and the preferences of the surgeon. The guiding catheter may have an inner diameter adapted to receive the clot removal system 150, for instance comprised between 1 mm and 3 mm and an outer diameter comprised between 1.5 mm and 3.5 mm. Such guiding catheters are preferably made of biocompatible materials, such as polyethylene or polyurethane, that provide flexibility, strength, and radiopacity. The choice of material aims to optimize maneuverability, durability, and visibility during the surgery.

The clot removal system 150 is then introduced 301 inside the body, either in a single step wherein the clot removal device 100 is directly contained in the delivery tube 41 or in two consecutive steps such as described below.

The delivery tube 41 is navigated through the guiding catheter to reach the precise location of the clot 11. This step requires skill and expertise to ensure proper positioning. Once the delivery tube 41 is in place near the clot 11, the clot removal device 100 is introduced through the delivery tube 41 and guided to the clot 11 site using the guiding wire 21

The dimensions of the delivery tube 41 are adapted to allow optimal navigation inside the guiding catheter. Moreover, the dimensions are also chosen depending on the target blood vessel's size and the compatibility with the clot removal device 100 used. Preferably, the delivery tube 41 has an outer diameter ranging from 0.3 mm to 0.7 mm. The inner diameter is preferably comprised between 0.2 mm and 0.5 mm. Delivery tubes 41 are typically made of flexible and biocompatible materials, such as polyurethane or polyethylene. These materials provide good trackability, torque control, and pushability while navigating through tortuous blood vessels 12.

In a subsequent step, the clot removal member 31 of the clot removal device 100 is deployed from the collapsed configuration 50 to the expanded configuration 60 within the blood vessel 12, allowing the two anchoring members 33, 34 to anchor to the clot 11. The clot removal member 31 may be deployed automatically when being slidably extracted 302 from within the delivery tube 41. The self-expending portions 35, 36 are no longer compressed by the delivery tube 41 and can go back to their original expanded configuration 60.

The delivery tube 41 together with the expanded clot removal device 100 is then slowly pulled back. This action entangles the clot 11 within the clot removal member 31 mesh structure, thus facilitating its capture and removal from the blood vessel 12. Once the clot 11 is safely captured within the clot removal member 31, the entire system 150, including the clot removal device 100 and the delivery tube 41, is carefully withdrawn from the body, thus restoring blood flow in the affected blood vessel 12.

The procedure may be guided by fluoroscopy, a real-time X-ray imaging technique that helps visualize the blood vessels and guide the placement and retrieval of the clot removal device 100.

The invention claimed is:

1. A clot removal device for removing at least one clot from an inside of a blood vessel, said blood vessel comprising a bifurcation wherein a proximal blood vessel is divided into at least two distal blood vessels,
said clot removal device comprising:
a guiding wire configured for navigating the clot removal device inside said blood vessel,
a clot removal member, configured to be positioned at the bifurcation, the clot removal member comprising:
a base configured to be positioned inside the proximal blood vessel, the base being connected to the guiding wire, and
two anchoring members, including a first anchoring member and a second anchoring member, wherein at least one of the first anchoring member and second anchoring member is configured to be positioned inside at least one of the two distal blood vessels, the anchoring members being connected to the base, each anchoring member comprising at least one self-expanding portion configured to adopt:
a collapsed configuration configured for navigating the clot removal device inside said blood vessel, and
an expanded configuration configured for anchoring to the clot
wherein the clot removal member is a mesh structure,
and wherein the first anchoring member has a length greater than a length of the second anchoring member,
and wherein the first anchoring member is folded around a first longitudinal axis and the second anchoring member is folded around a second longitudinal axis which is distinct from the first longitudinal axis.

2. The device according to claim 1, wherein each anchoring member is configured to wrap around a first longitudinal axis, the self-expanding portion having:
a collapsed diameter when in the collapsed configuration, and
an expanded diameter when in the expanded configuration,
the expanded diameter being greater than the collapsed diameter.

3. The device according to claim 1, wherein the clot removal member is a layered structure comprising a distal region and a proximal region positioned along a third longitudinal axis of the clot removal member, the distal region comprising a longitudinal slit so as to form the first anchoring and the second anchoring member on both sides of the slit, the base being formed in the proximal region.

4. The device according to claim 1, wherein the first anchoring member is configured to be positioned inside one of the two distal blood vessels and the second anchoring member is configured to be positioned inside the proximal blood vessel.

5. A clot removal system comprising a delivery tube, said delivery tube comprising a clot removal device according to claim 1, said delivery tube being configured to allow the clot removal device to slidably move within said delivery tube, wherein the self-expanding portion are in the collapsed configuration when contained in the delivery tube and wherein the self-expanding portion are configured to adopt the expanded configuration when outside of the delivery tube.

6. A method for removing at least one clot from an inside of a blood vessel using a clot removal system according to claim 5, said blood vessel comprising a bifurcation wherein a proximal blood vessel is divided into at least two distal blood vessels, said method comprising the steps of:
introducing the clot removal system inside said blood vessel, slidably extracting the clot removal device from within said delivery tube, so that the self-expanding portions adopt the expanded configuration and the clot removal member is positioned at the bifurcation with the base positioned inside the proximal blood vessel and at least one of the first anchoring member and second anchoring member is positioned inside at least one of the two distal blood vessels.

7. A method for removing at least one clot from an inside of a blood vessel using a clot removal device according to claim 1, said blood vessel comprising a bifurcation wherein a proximal blood vessel is divided into at least two distal blood vessels, said method comprising the steps of:

introducing the clot removal device inside said blood vessel so that the clot removal member is positioned at the bifurcation with the base positioned inside the proximal blood vessel and at least one of the first anchoring member and second anchoring member is positioned inside at least one of the two distal blood vessels, and making the self-expanding portions adopt the expanded configuration so that the anchoring members can anchor to the clot.

8. The method according to claim 7, wherein the method further comprises the step of navigating the clot removal device outside of the blood vessel using the guiding wire.

* * * * *